(12) United States Patent
Zhang et al.

(10) Patent No.: US 9,092,804 B2
(45) Date of Patent: Jul. 28, 2015

(54) METHODS AND SYSTEMS FOR MAPPING LOCATIONS OF WIRELESS TRANSMITTERS FOR USE IN GATHERING MARKET RESEARCH DATA

(71) Applicant: The Nielsen Company (US), LLC, Schaumburg, IL (US)

(72) Inventors: Jack K. Zhang, Ijamsville, MD (US); James M. Jensen, Columbia, MD (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 14/175,918

(22) Filed: Feb. 7, 2014

(65) Prior Publication Data
US 2014/0156350 A1 Jun. 5, 2014

Related U.S. Application Data

(63) Continuation of application No. 13/556,858, filed on Jul. 24, 2012, now abandoned, which is a continuation of application No. 10/800,884, filed on Mar. 15, 2004, now Pat. No. 8,229,469.

(51) Int. Cl.
*H04W 4/22* (2009.01)
*G06Q 30/02* (2012.01)

(52) U.S. Cl.
CPC ............ *G06Q 30/0267* (2013.01); *G06Q 30/02* (2013.01)

(58) Field of Classification Search
CPC .............. G06Q 30/20; G06Q 30/0641; G06Q 30/0643; H04W 4/22; H04W 4/02; H03J 7/18
USPC ............... 455/404.2, 414.1, 414.2, 466, 41.2, 455/457, 566, 154.2, 434, 456.1; 705/26.1, 705/26.9, 27.1, 27.2
See application file for complete search history.

(56) References Cited

U.S. PATENT DOCUMENTS

| 4,930,011 A | 5/1990 | Kiewit |
| 4,973,952 A | 11/1990 | Malec et al. |
| 5,214,793 A | 5/1993 | Conway et al. |

(Continued)

FOREIGN PATENT DOCUMENTS

WO 9111062 7/1991

OTHER PUBLICATIONS

United States Patent and Trademark Office, "Office Action," issued in connection with U.S. Appl. No. 10/800,884, on Mar. 29, 2006 (5 pages).
United States Patent and Trademark Office, "Office Action," issued in connection with U.S. Appl. No. 10/800,884, on Oct. 5, 2006 (6 pages).
United States Patent and Trademark Office, "Office Action," issued in connection with U.S. Appl. No. 10/800,884, on Mar. 30, 2007 (4 pages).

(Continued)

*Primary Examiner* — Cong Tran
(74) *Attorney, Agent, or Firm* — Hanley, Flight and Zimmerman, LLC

(57) ABSTRACT

Methods and systems are disclosed to map locations of wireless transmitters for use in gathering market research data. A disclosed example method involves displaying a representation of a commercial establishment on a portable device, obtaining transmitter data via the portable device from a wireless transmitter located within the commercial establishment, and in response to the portable device receiving a user selection of a first location on the representation of the commercial establishment, associating the first location with the transmitter data and location information generated by the portable device representative of a physical location in the commercial establishment.

21 Claims, 6 Drawing Sheets

(56) References Cited

U.S. PATENT DOCUMENTS

| | | | |
|---|---|---|---|
| 5,461,390 A | 10/1995 | Hoshen | |
| 5,483,276 A | 1/1996 | Brooks et al. | |
| 5,485,634 A | 1/1996 | Weiser et al. | |
| 5,510,828 A | 4/1996 | Lutterbach et al. | |
| 5,541,585 A | 7/1996 | Duhame et al. | |
| 5,546,072 A | 8/1996 | Creuseremee et al. | |
| 5,612,741 A | 3/1997 | Loban et al. | |
| 5,642,303 A | 6/1997 | Small et al. | |
| 5,764,763 A | 6/1998 | Jensen et al. | |
| 5,848,129 A | 12/1998 | Baker | |
| 5,920,261 A | 7/1999 | Hughes et al. | |
| 5,923,252 A | 7/1999 | Sizer et al. | |
| 5,966,696 A | 10/1999 | Giraud | |
| 6,091,956 A | 7/2000 | Hollenberg | |
| 6,252,522 B1 | 6/2001 | Hampton et al. | |
| 6,266,442 B1 | 7/2001 | Laumeyer et al. | |
| 6,286,005 B1 | 9/2001 | Cannon | |
| 6,360,167 B1 | 3/2002 | Millington et al. | |
| 6,484,148 B1 | 11/2002 | Boyd | |
| 6,507,802 B1 | 1/2003 | Payton et al. | |
| 6,546,257 B1 | 4/2003 | Stewart | |
| 6,571,279 B1 | 5/2003 | Herz et al. | |
| 6,572,020 B2 | 6/2003 | Barkan | |
| 6,580,916 B1 | 6/2003 | Weisshaar et al. | |
| 6,587,835 B1 * | 7/2003 | Treyz et al. | 705/14.64 |
| 6,633,763 B2 | 10/2003 | Yoshioka | |
| 6,647,269 B2 | 11/2003 | Hendrey et al. | |
| 6,720,876 B1 | 4/2004 | Burgess | |
| 6,845,360 B2 | 1/2005 | Jensen et al. | |
| 6,900,762 B2 | 5/2005 | Andrews et al. | |
| 6,934,508 B2 | 8/2005 | Ceresoli et al. | |
| 6,954,735 B1 * | 10/2005 | Djupsjobacka et al. | 705/26.8 |
| 6,957,073 B2 | 10/2005 | Bye | |
| 6,958,710 B2 | 10/2005 | Zhang et al. | |
| 6,961,555 B1 | 11/2005 | Philyaw | |
| 6,970,131 B2 | 11/2005 | Percey et al. | |
| 7,006,982 B2 | 2/2006 | Sorensen | |
| 7,015,817 B2 | 3/2006 | Copley et al. | |
| 7,024,195 B2 | 4/2006 | Miriyala et al. | |
| 7,130,622 B2 | 10/2006 | Vänskä et al. | |
| 7,200,566 B1 | 4/2007 | Moore et al. | |
| 7,239,878 B2 | 7/2007 | Bazin et al. | |
| 7,539,485 B2 | 5/2009 | Ono et al. | |
| 8,612,294 B1 * | 12/2013 | Treyz et al. | 705/14.62 |
| 2001/0016489 A1 | 8/2001 | Haymes et al. | |
| 2001/0028301 A1 | 10/2001 | Geiger et al. | |
| 2001/0040512 A1 | 11/2001 | Hines et al. | |
| 2002/0002504 A1 | 1/2002 | Engel et al. | |
| 2002/0004740 A1 | 1/2002 | Shotey et al. | |
| 2002/0097193 A1 | 7/2002 | Powers | |
| 2002/0107027 A1 | 8/2002 | O'Neil | |
| 2002/0158133 A1 | 10/2002 | Conzola et al. | |
| 2002/0161651 A1 | 10/2002 | Godsey et al. | |
| 2003/0005430 A1 | 1/2003 | Kolessar | |
| 2003/0013445 A1 | 1/2003 | Fujiwara et al. | |
| 2003/0040969 A1 * | 2/2003 | O'Hagan et al. | 705/21 |
| 2003/0055707 A1 | 3/2003 | Busche et al. | |
| 2003/0061002 A1 | 3/2003 | Steinbrecher | |
| 2003/0097302 A1 | 5/2003 | Overhultz et al. | |
| 2003/0132298 A1 * | 7/2003 | Swartz et al. | 235/472.02 |
| 2003/0151506 A1 | 8/2003 | Lucckketti | |
| 2003/0164789 A1 | 9/2003 | Taylor, Jr. et al. | |
| 2003/0170001 A1 | 9/2003 | Breen | |
| 2003/0171833 A1 | 9/2003 | Crystal et al. | |
| 2003/0171975 A1 | 9/2003 | Kirshenbaum | |
| 2003/0181168 A1 | 9/2003 | Herrod et al. | |
| 2004/0015399 A1 | 1/2004 | Maggio | |
| 2004/0019675 A1 | 1/2004 | Hebeler, Jr. et al. | |
| 2004/0027271 A1 | 2/2004 | Schuster et al. | |
| 2004/0039661 A1 * | 2/2004 | Fuzell-Casey et al. | 705/27 |
| 2004/0059498 A1 | 3/2004 | Chinomi et al. | |
| 2004/0102961 A1 | 5/2004 | Jensen et al. | |
| 2004/0122727 A1 | 6/2004 | Zhang et al. | |
| 2004/0127192 A1 | 7/2004 | Ceresoli et al. | |
| 2004/0171391 A1 | 9/2004 | Muramatsu | |
| 2004/0186768 A1 | 9/2004 | Wakim et al. | |
| 2004/0203931 A1 | 10/2004 | Karaoguz | |
| 2005/0035857 A1 | 2/2005 | Zhang et al. | |
| 2005/0059412 A1 | 3/2005 | Hosokawa | |
| 2005/0159863 A1 | 7/2005 | Howard et al. | |
| 2005/0197136 A1 | 9/2005 | Friday et al. | |
| 2005/0201826 A1 | 9/2005 | Zhang et al. | |
| 2005/0234774 A1 | 10/2005 | Dupree | |
| 2005/0243784 A1 | 11/2005 | Fitzgerald et al. | |
| 2006/0267783 A1 | 11/2006 | Smith | |
| 2008/0172173 A1 | 7/2008 | Chang et al. | |
| 2010/0273433 A1 | 10/2010 | Ozaki et al. | |

OTHER PUBLICATIONS

United States Patent and Trademark Office, "Office Action," issued in connection with U.S. Appl. No. 10/800,884, on Nov. 6, 2007 (5 pages).

United States Patent and Trademark Office, "Office Action," issued in connection with U.S. Appl. No. 10/800,884, on Apr. 23, 2008 (7 pages).

United States Patent and Trademark Office, "Office Action," issued in connection with U.S. Appl. No. 10/800,884, on Aug. 21, 2008 (5 pages).

United States Patent and Trademark Office, "Office Action," issued in connection with U.S. Appl. No. 10/800,884, on Feb. 9, 2009 (6 pages).

United States Patent and Trademark Office, "Office Action," issued in connection with U.S. Appl. No. 10/800,884, on May 26, 2011 (8 pages).

United States Patent and Trademark Office, "Office Action," issued in connection with U.S. Appl. No. 10/800,884, on Nov. 2, 2011 (8 pages).

* cited by examiner

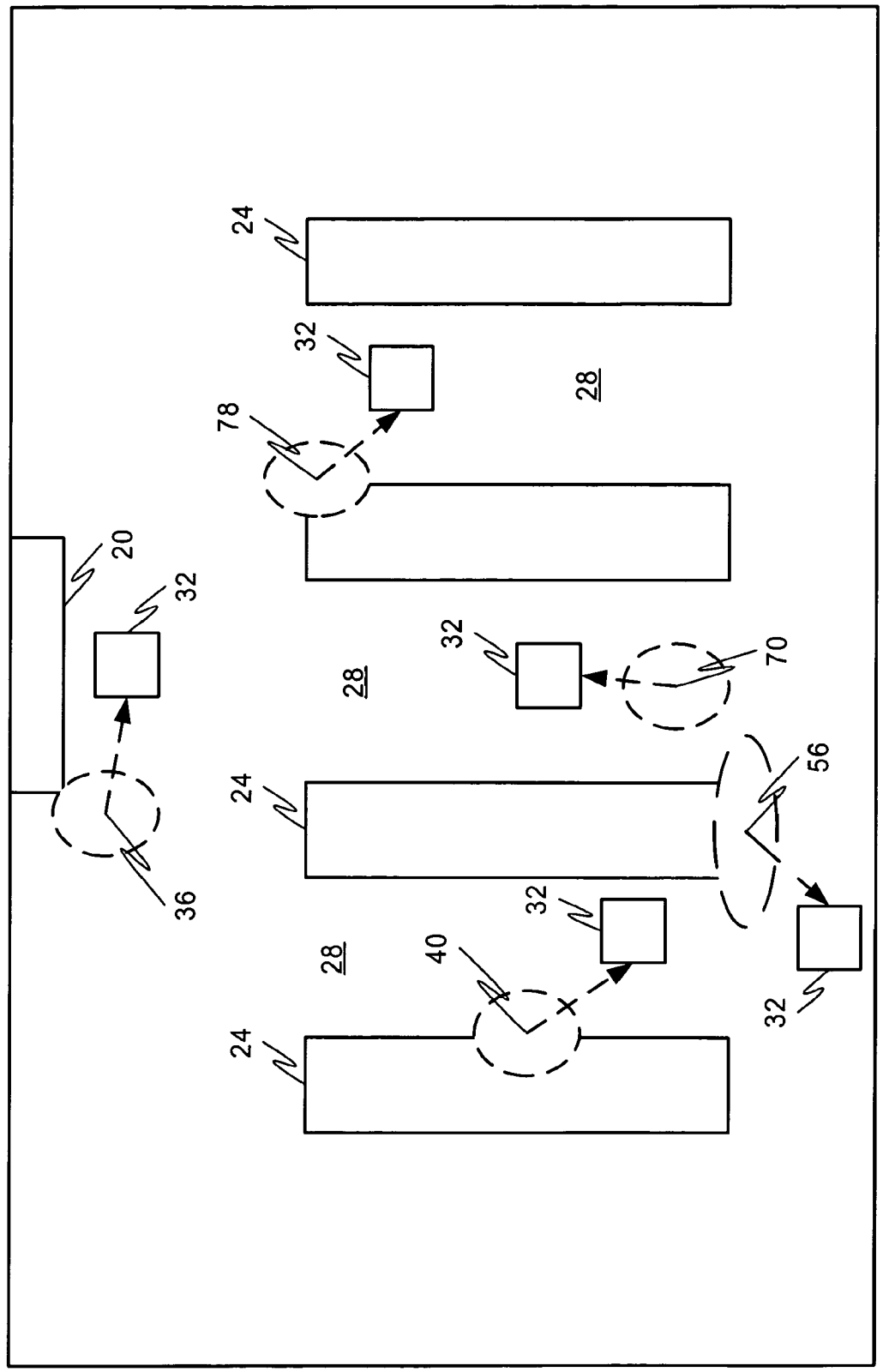

FIGURE 2

| Client | Store | In-Store Location | Transmitter ID | Product and/or Promotional Display | Distributor/ Manufacturer |
|---|---|---|---|---|---|
| Ed's Emporium | Bayville | E1 | 9562 | | |
| Ed's Emporium | Bayville | A1M | 8723 | Champ's Chomp Dog Food | Dog's Best Friend |
| Ed's Emporium | Bayville | A1B | 2321 | Double Whammy Cola | Zap! Distributors |
| Ed's Emporium | Bayville | A2F | 5584 | Glug Beer | F, L & H |
| Ed's Emporium | Bayville | A5F | 1950 | Grim Reaper Bug Spray | W&S |
| Ed's Emporium | Bayville | A6B | 7878 | 4 I's Reading Glasses | Optics-R-Us |
| Wilton Market | Wilton | E1 | 1973 | | |
| Wilton Market | Wilton | A1F | 1987 | Henri's Foi Gras | Swanky Frank's |
| Wilton Market | Wilton | A2B | 4527 | Acme Escargot | Snail's Pace |

| Commercial Establishment ID | Transmitter ID | Panelist ID | Time of Day | Duration |
|---|---|---|---|---|
| Ed's Emporium | 9562 | 1251 | 10:00 | <5 seconds |
| Ed's Emporium | 8723 | 1251 | 10:03 | 20 |
| Ed's Emporium | 2321 | 1251 | 10:04 | 30 |
| Ed's Emporium | 1950 | 1251 | 10:10 | 10 |
| Ed's Emporium | 7878 | 1251 | 10:13 | 30 |
| Ed's Emporium | 9562 | 1251 | 10:20 | <5 |

114

METHODS AND SYSTEMS FOR MAPPING LOCATIONS OF WIRELESS TRANSMITTERS FOR USE IN GATHERING MARKET RESEARCH DATA

RELATED APPLICATIONS

This patent arises from a continuation of U.S. patent application Ser. No. 13/556,858, filed Jul. 24, 2012, which is a continuation of U.S. patent application Ser. No. 10/800,884, filed Mar. 15, 2004, U.S. Pat. No. 8,229,469, titled "Methods and Systems for Mapping Locations of Wireless Transmitters for Use in Gathering Market Research Data," issued Jul. 24, 2012, which are incorporated by reference in their entirety herein.

FIELD OF THE DISCLOSURE

The present invention relates to methods and systems for mapping locations of wireless transmitters for use in gathering market research data.

BACKGROUND

Managers of commercial establishments, such as retail stores, shopping malls, transportation centers and the like, responsible for maximizing sales of products and services, are well aware that the layout of their facilities has a substantial impact on sales volume. To evaluate this impact, it is necessary to gather data characterizing the flow of customer traffic into and within the facility. This data will reveal the locations where customers are present more frequently ("hot spots") and those where customer traffic is lighter ("cold spots"). With this information, it is possible for the manager to make changes in features that affect accessibility, lighting, fixture space, product placement, and the like that will improve product exposure and reduce the number and/or size of cold spots.

The tracking data, along with product placement data are also important to distributors of products sold in commercial establishments. This information enables them to evaluate whether their products are receiving sufficient attention in a retail store, so that the cost of shelf space is justified. It also enables them to assess whether they should request shelf space for their products in a different location in the store.

Traditionally such traffic flow studies have been conducted manually. One or more of the manager's employees would record the movements of customers within the facility on a sheet representing its layout. The accumulated data would then be reviewed by the manager. Clearly, this is a labor-intensive way of gathering such data. It is also potentially annoying to customers if the employees tracking them are not very discrete.

U.S. Pat. No. 7,463,143, titled "Methods and Systems for Gathering Market Research Data Within Commercial Establishments," assigned to the assignee of the present application and hereby incorporated herein by reference in its entirety, discloses cost effective and potentially less annoying techniques for gathering market research data concerning the presence and movements of customers in commercial establishments and elsewhere. These techniques employ one or more wireless transmitters placed near or within such commercial establishments. It is often necessary to map the identities or other relevant data of the transmitters to their locations to be able to determine the presence and movements of customers participating in such market research studies.

A further useful application of wireless transmitters in market research is in gathering data indicating exposure of panelists to billboards, posters and other types of media displays providing advertisements or other promotional information. The wireless transmitters are placed in proximity to the media displays to transmit a location signal which is received by a portable monitor carried by a panelist to indicate the panelist's exposure to the media display.

In order to carry out such marketing studies, it is often necessary to map the identities or other relevant data of the various wireless transmitters to their locations and/or to the media display, product display, product or other object of interest. It is desirable, therefore, to provide setup methods, devices and systems for the transmitters that efficiently record their locations or other key data in a database from which suitable reports may be produced, using a minimum amount of effort and expense.

SUMMARY

For this application the following terms and definitions shall apply:

The term "data" as used herein means any indicia, signals, marks, symbols, domains, symbol sets, representations, and any other physical form or forms representing information, whether permanent or temporary, whether visible, audible, acoustic, electric, magnetic, electromagnetic or otherwise manifested. The term "data" as used to represent predetermined information in one physical form shall be deemed to encompass any and all representations of the same predetermined information in a different physical form or forms.

The term "media data" as used herein means data which is widely accessible, whether over-the-air, or via cable, satellite, network, internetwork (including the Internet), distributed on storage media, or otherwise, without regard to the form or content thereof, and including but not limited to audio, video, text, images, animations, web pages and streaming media data.

The term "database" as used herein means an organized body of related data, regardless of the manner in which the data or the organized body thereof is represented. For example, the organized body of related data may be in the form of a table, a map, a grid, a list or in any other form.

The term "layout map" as used herein means a database of data representing locations in an area or areas for the purpose of market research.

The term "network" as used herein includes both networks and internetworks of all kinds, including the Internet, and is not limited to any particular network or inter-network.

The terms "first" and "second" are used to distinguish one element, set, data, object or thing from another, and are not used to designate relative position or arrangement in time.

The terms "coupled", "coupled to", and "coupled with" as used herein each mean a relationship between or among two or more devices, apparatus, files, programs, media, components, networks, systems, subsystems, and/or means, constituting any one or more of (a) a connection, whether direct or through one or more other devices, apparatus, files, programs, media, components, networks, systems, subsystems, or means, (b) a communications relationship, whether direct or through one or more other devices, apparatus, files, programs, media, components, networks, systems, subsystems, or means, and/or (c) a functional relationship in which the operation of any one or more devices, apparatus, files, programs, media, components, networks, systems, subsystems, or means depends, in whole or in part, on the operation of any one or more others thereof.

The terms "communicate" and "communication" as used herein include both conveying data from a source to a destination, and delivering data to a communications medium, system or link to be conveyed to a destination.

The term "processor" as used herein means processing devices, apparatus, programs, circuits, systems and subsystems, whether implemented in hardware, software or both.

The terms "storage" and "data storage" as used herein mean data storage devices, apparatus, programs, circuits, systems, subsystems and storage media serving to retain data, whether on a temporary or permanent basis, and to provide such retained data.

In accordance with an aspect of the present invention, a method is provided for mapping locations of wireless transmitters having associated transmitter representative data and positioned for detecting the presence of participants in market research. The method comprises providing a portable device storing data representing locations within a research area relevant to the market research; inputting transmitter location data in the portable device representing selected locations of the wireless transmitters relative to the research area; and associating data representing each wireless transmitter with respective transmitter location data in the portable device.

In accordance with a further aspect of the present invention, a system is provided for mapping locations of wireless transmitters having transmitter representative data and positioned for detecting the presence of participants in market research. The system comprises a portable device storing location data representing locations within a research area relevant to the market research; and a processor within the portable device operative to associate the location data with data representing respective wireless transmitters positioned at the locations.

In accordance with another aspect of the present invention, a method is provided for mapping locations of wireless transmitters used in market research. The method comprises providing a layout map including location data representing a plurality of locations within a market research area; providing transmitter data representing respective ones of the wireless transmitters; and associating the transmitter data with the location data.

BRIEF DESCRIPTION OF THE DRAWINGS

Embodiments of the present invention are illustrated by way of example and not limitation in the figures of the accompanying drawings, in which like references indicate similar elements and in which:

FIG. 1 is a schematic diagram of a floor of a retail store for use in illustrating certain embodiments of the present invention;

FIG. 2 is a schematic representation of a table of a database populated by means of certain embodiments of the present invention;

FIG. 6 is a schematic representation of a table of a database populated with data for use in market research.

DETAILED DESCRIPTION

Figure 3:
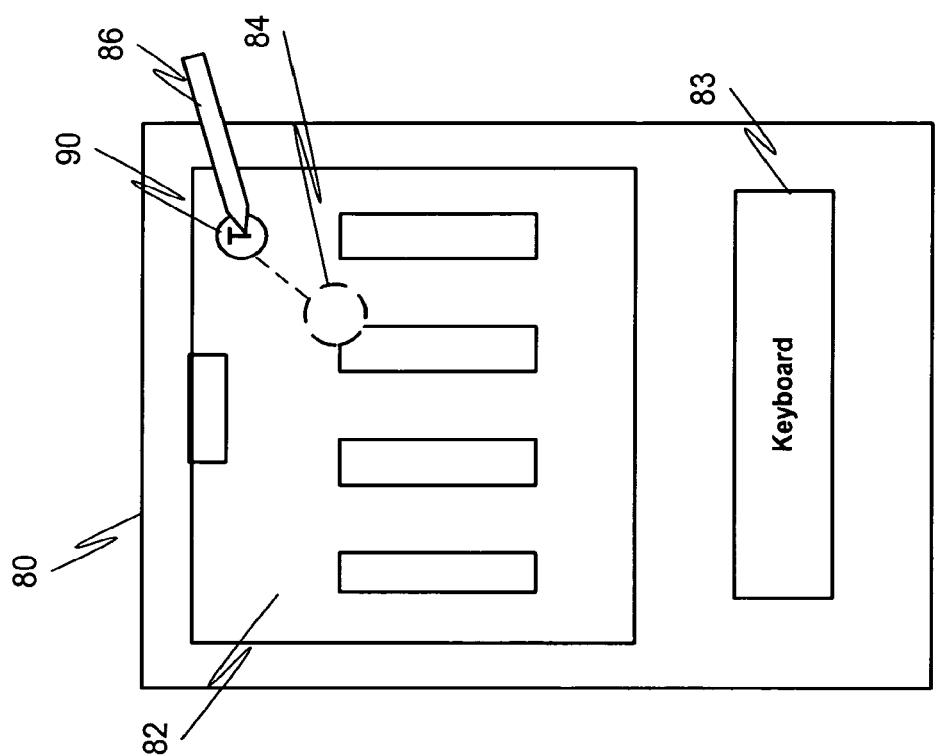
FIG. 3 schematically illustrates a user interface of a portable device of an embodiment of the present invention.

The present invention is useful for facilitating the set up of market research studies that employ wireless transmitters to detect the presence and/or movements of individuals participating in such studies. These studies provide various types of data useful to marketers, advertisers, media organizations, managers and the like, to assess exposure to advertising and promotional efforts, their effects on customer behavior as well as other facets of customer behavior.

An example of devices, methods and systems useful in conducting a traffic flow study employing wireless transmitters and useful to a store manager as well as to the store's product suppliers in assessing the behavior of customers in the store, is now provided. FIG. 1 schematically illustrates a floor of a retail store having an entrance 20 and a plurality of fixtures 24 comprising shelving for products offered for sale. The fixtures 24 define aisles 28 therebetween.

A portable monitor 32 is carried on the person of a panelist participating in a market research study to track the presence and movements of the panelist into and within the retail store, as well as other such retail stores participating in the study. As depicted in FIG. 1, when the panelist enters the retail store at the entrance 20, the portable monitor 32 carried by the panelist receives a location signal from a radio frequency (RF) transmitter 36 positioned in proximity to the entrance 20. In certain embodiments, acoustic transmitters, infrared light transmitters and/or visible light transmitters are employed in place of or in addition to one or more RF transmitters in conducting the study.

The location signal contains data from which the presence of the panelist at the entrance can be determined. Such data in certain embodiments comprises a transmitter identification code that uniquely identifies the transmitter 36. This transmitter identification code is stored in a database where it is associated with data identifying the location of the transmitter at the entrance to the retail store.

The strength of the transmitted location signal, along with the capabilities of the monitor 32 to receive and accurately decode the data in the transmitted location signal are selected to ensure that monitor 32 will only detect the data contained in the location signal when it is sufficiently near the identified location. When the monitor 32 detects the data contained in the location signal, it either stores the data or data based thereon, together with a time stamp indicating the time at which the data was received.

After the panelist has entered the store and then proceeds down an aisle 28 flanked by shelves holding various products offered for sale, the panelist comes into the range of a transmitter 40. The portable monitor 32 carried by the panelist then detects the data contained in a further location signal from the transmitter 40, and stores it along with a time stamp indicating the time of detection of the further location signal. If the panelist lingers in the vicinity of transmitter 40, this indicates that the panelist may be interested in purchasing a product adjacent the transmitter.

Accordingly, periodically or from time to time the monitor 32 checks for the detection of the data contained in the same or a different location signal. If the data of the further location signal has again been detected, the monitor 32 stores further data indicating a duration of the continuous presence of the panelist in the vicinity of transmitter 40.

As the panelist pauses in the vicinity of a transmitter 56 shown in FIG. 1 near the end of a store fixture 24, the monitor detects a further location signal from transmitter 56. The transmitter 56 may be mounted on a product display, which serves to attract attention to a product, which it carries or contains. As the panelist stops by the product display, the monitor records data indicating the duration of the panelist's presence near the product display providing an indication of its effectiveness in attracting consumer attention.

As the panelist proceeds down another aisle, the monitor 32 detects data contained in a location signal from a transmitter 70 placed above the aisle to estimate the amount of traffic therethrough to detect whether the aisle is a "cold spot" in the store. The detected data is stored by the monitor 32 in a respective record.

Still later the panelist pauses in the vicinity of another transmitter 78 to examine a product. Shortly thereafter, the panelist proceeds to the checkout counter to pay for the selected products, and then leaves the store, which is recorded in the monitor 32 by a further detection of the location signal from transmitter 36.

In order to carry out the market flow study as illustrated by FIG. 1, in certain embodiments a market research installer installs transmitters 36, 40, 56, 70, and 78 at their selected locations. In certain embodiments, the transmitters comprise stand-alone devices which store all necessary data for communication with the monitor 32. In certain embodiments, the transmitters comprise RFID tags, and/or any other suitable wireless transmitters. In certain embodiments, the transmitters are coupled with existing data storage and/or communication devices, such as intelligent shelf systems. Intelligent shelf systems serve to gather data concerning products placed on shelves or other product presentation devices for inventory control purposes and communicate such data as well as the identity of the shelf or other device being monitored. The transmitter 40 is coupled with the intelligent shelf system to obtain the data provided thereby and serves to transmit it wirelessly to be received by the monitor 32. In such embodiments, the transmitter 40 either is installed by the market research installer, or constitutes a wireless transmitter forming a part of the intelligent shelf system. An example of a market research system that cooperates with an intelligent shelf system as described above is disclosed in U.S. patent application Ser. No. 10/800,883 filed concurrently herewith in the names of James M. Jensen and Eugene L. Flanagan III, assigned to the assignee of the present application and hereby incorporated herein by reference in its entirety. The installer or another also records various data associated with each installed transmitter such as client name, geographic location of the install, location of the transmitter at the research site, transmitter ID, the product and/or promotional display that the transmitter was located on or near, and/or the name of the distributor/manufacturer whose product and/or promotional display that the transmitter was located on or near.

In certain embodiments, market research personnel log the locations of previously installed transmitters and data provided thereby. Such previously installed transmitters include wireless data communication devices which serve to wirelessly communicate data from intelligent shelf systems, including shelf or other product presentation device identification data and/or data concerning products presented for sale thereby.

An example illustrating the recordation of such data is shown by table 79 of FIG. 2 and the examples of the data and the types of data can include more or fewer data types. The manual entry of such data into table 79 or similar data record would be labor intensive and prone to error due to the numerous opportunities to incorrectly enter erroneous data. Also, timely access to the entered data would be a problem because of the period of time that lapses between data entry and its availability for use by a market researcher.

The present invention addresses this challenge by providing methods and systems for mapping locations of the wireless transmitters quickly and efficiently by means of a portable device that is enabled to relay the entered data in near-real time. An embodiment of such a device is illustrated as portable device 80 of FIG. 3. Portable device 80 is a device such as a PDA, cellphone, laptop, organizer or the like on which a map 82 is presented to a user, e.g., market researcher and/or market research installer.

Map 82 represents a data set displayed on portable device 80 that depicts a particular location such as that of a particular commercial establishment, e.g. the location represented in FIG. 1. In certain embodiments, map 82 represents locations through the use of a coordinate system, e.g. a coordinate system controlled by a positioning system such as the global positioning system ("GPS"). In certain embodiments, the map 82 represents a location of a commercial establishment or objects or features therein. such as rooms, fixtures, aisles, floors and the like. The locations can be represented by absolute or relative data, and can be either approximate or precise, depending on the application.

Figure 4:
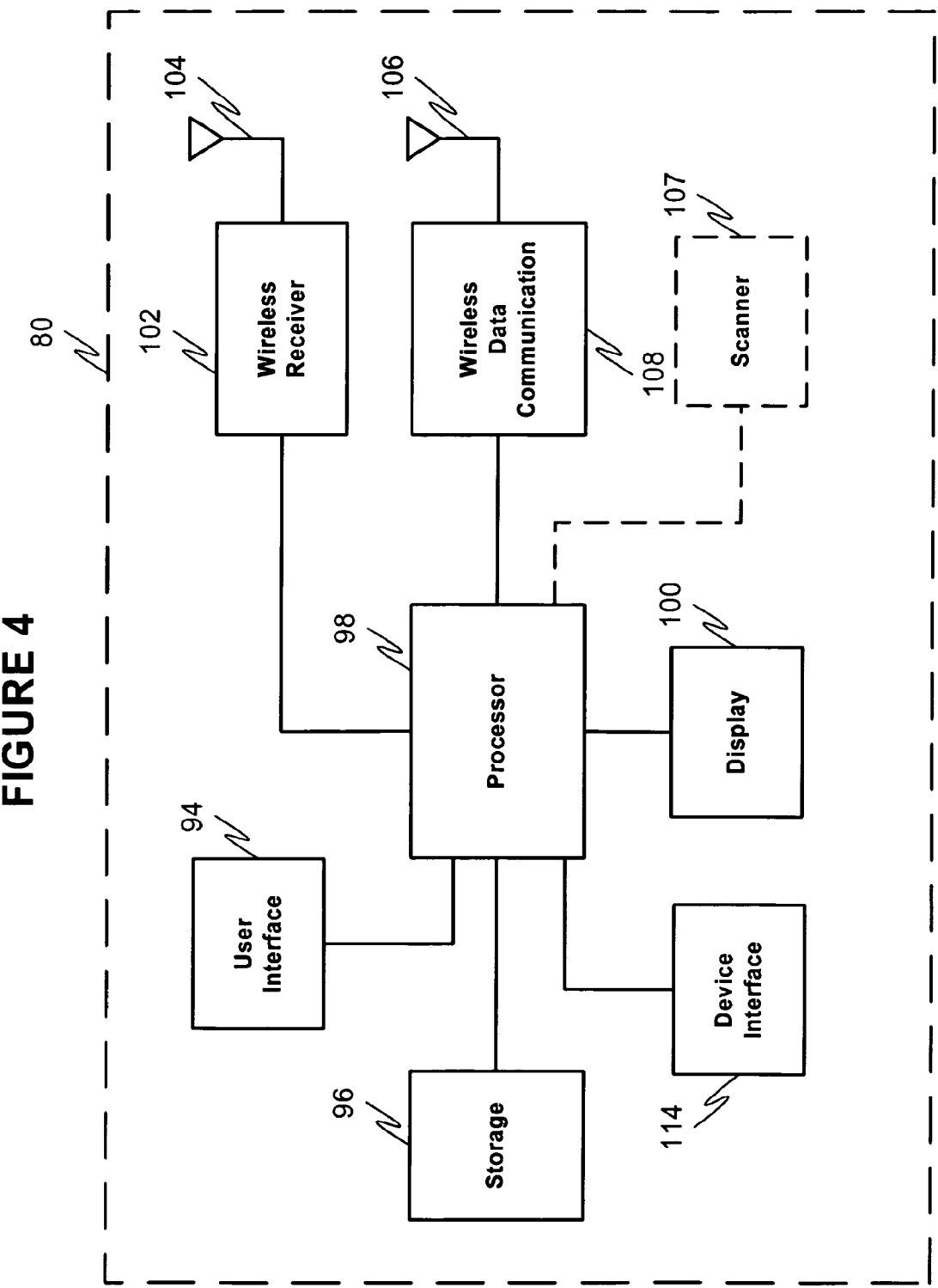
FIG. 4 is a block diagram of the portable device of FIG. 3.

FIG. 4 schematically illustrates the portable device 80 in block diagram format. A user can enter data such as transmitter location data, e.g., for transmitter 78, into portable device 80 through user interface 94. User interface 94 in various embodiments comprises a keyboard, touchscreen, mouse, joystick, trackball, voice activated interface, microphone, or the like by which a user can enter data into portable device 80.

The entered transmitter location data is processed by processor 98, which is in communication with user interface 94, according to the needs of portable device 80 and the user. For example, data entered through user interface 94 can be sent to storage 96 for later recall and/or the data can be sent to display 100 for presentation to the user.

Portable device 80 also includes wireless receiver 102 and first antenna 104 for communicating with a transmitter being installed. In certain embodiments such communication is carried out for checking and/or setting the operational parameters of the transmitter as well as for recording the transmitter ID data from a particular transmitter. In certain embodiments, the functions of wireless receiver 102 are carried out by an RFID reader. In certain embodiments, in addition to or instead of wireless receiver 102, portable device 80 includes a scanner 107 by which a user scans a code disposed on a transmitter to enter transmitter ID number data into the system. As an alternative to the foregoing, or in addition thereto, certain embodiments enable the user to enter a transmitter ID number using user interface 94, e.g. keyboard 83. In addition, portable device 80 contains wireless data communication 108 and second antenna 106 for enabling portable device 80 to communicate with a centralized or remote processor.

Figure 5:
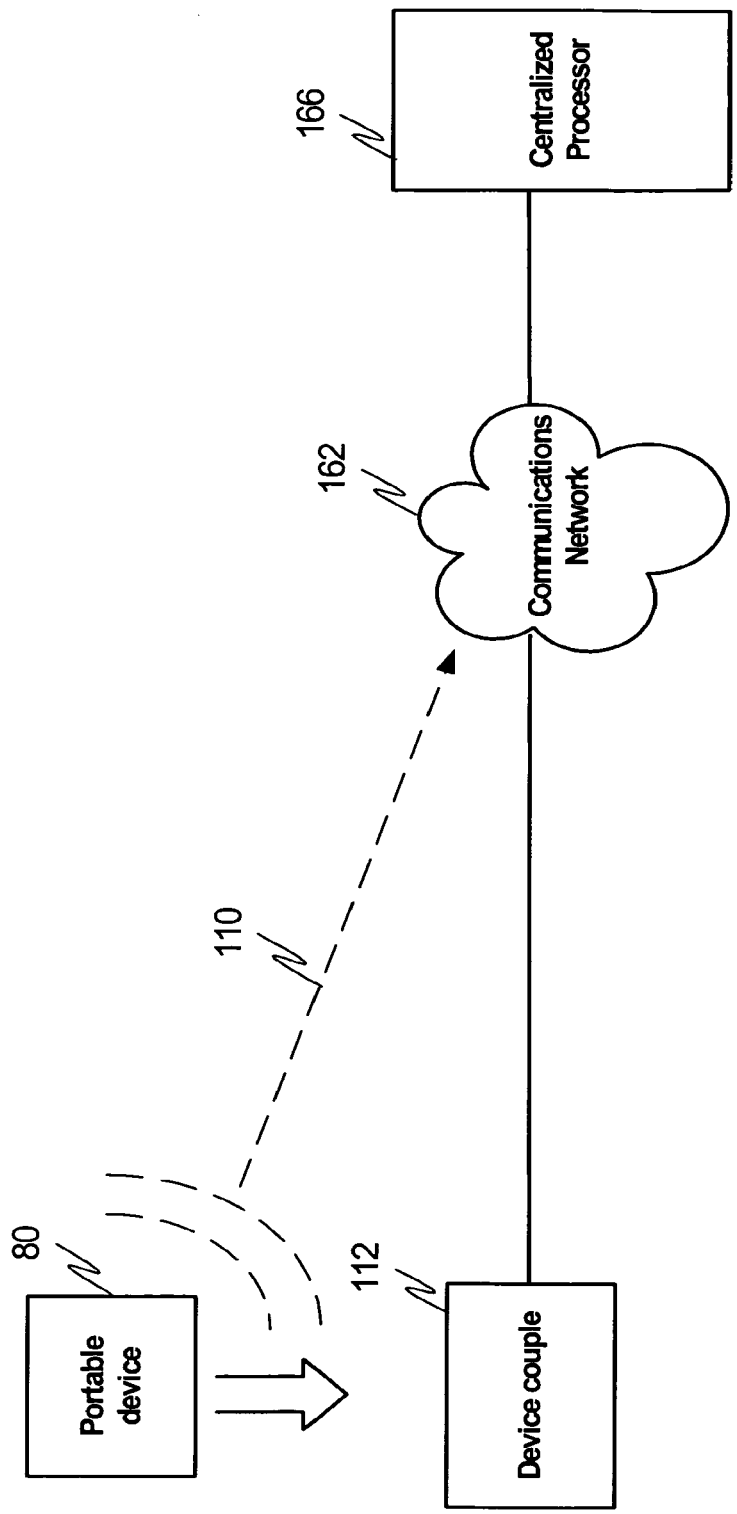
FIG. 5 illustrates various techniques for downloading data from the portable device of FIGS. 3 and 4.

For instance and referring to FIG. 5, portable device 80 sends a signal 110 generated by wireless data communication 108 and transmitted by second antenna 106 to communication network 162. The wireless communications link can be of any technology known in the art such as a cell network, WiFi network, wireless Local area network (LAN), or the like. Signal 110 contains transmitter location data that can be relayed by communications network 162 to centralized processor 166, which stores transmitter location data in a database that can represent data in a form such as table 79.

In certain embodiments, in the alternative to the foregoing or in addition thereto portable device 80 includes device interface 114 (see FIG. 4), which interfaces with device couple 112 (see FIG. 5) to relay data over communications network 162. This embodiment is realized using any technology known in the art such as a modem/phone jack connection, contacts/contacts port connection, wireless transceiver pair, and the like.

An example of how the present invention is utilized will now be described. In one embodiment of the present invention, portable device 80 is used by a user such as a market researcher and/or a market research installer to set up a market research site in a commercial establishment such as the one schematically shown in FIG. 1. The user initiates the setup process by retrieving from storage 96 of portable device 80, map 82 of the commercial establishment in which the user is setting up the market research site. In certain embodiments the user retrieves map 82 from centralized processor 166 via wireless data communication 108 and/or device interface 114. In certain embodiments the user creates map 82 on-site on portable device 80. In certain embodiments the user uses a combination of two or more of the foregoing methods to generate map 82.

Once the user has access to map 82 on display 100 of portable device 80, the user can begin the process of installing the data representing the location of transmitters installed in the market research area. In one embodiment, wireless receiver 102 of portable device 80 receives a signal from a transmitter being installed and detects the data therein. In certain embodiments, scanner 107 is employed to input transmitter data. In certain embodiments display 100 presents data in the form of an image 90 associated with data representing the transmitter and its location. In certain embodiments, image 90 is produced in response to receipt or input of transmitter data. In certain embodiments, the insertion of image 90 is controlled by a user activating a selectable connection on portable device 80 to input transmitter data.

The user manipulates the location of image 90 to move image 90 to a position on map 82 corresponding to the location of the transmitter. Portable device 80 then stores a record including the detected data from the transmitter along with data representing its position generated by the positioning of the image 90.

For instance, the position of image 90 is moved from its present position to location 84 on map 82, which correlates to the location of transmitter 78 in FIG. 1. User interface 94 in this embodiment is a touch screen activated through the use of stylus 86 or other similar object. In certain embodiments user interface 94 enters data to manipulate image 90 by means of a keyboard, mouse, joystick, trackball and/or voice activated command module.

If the market research study requires the installation of more than one transmitter at this location, then the user continues to record data indicative of the location of additional transmitters placed for a particular market research study in a particular commercial establishment using portable device 80. The data indicative of transmitter location then can be stored in storage 96, processed further by processor 98, and/or relayed to centralized processor 166 for further processing.

In certain embodiments, the centralized processor 166 stores the received transmitter location data in one or more databases from which it is accessed to produce market research reports based on data representing the locations of transmitters in a commercial establishment. Such a market research report can include the data from table 79 and data gathered from monitor 32, for example, as illustrated by table 114 in FIG. 6. The transmitters' location data can be accessed and evaluated with the data from various parts of tables 79 and 114 to produce useful market research reports concerning the likely behavior of customers when they are exposed to a particular product and/or service, and/or promotional display.

Although various embodiments of the present invention have been described with reference to a particular arrangement of parts, features and the like, these are not intended to exhaust all possible arrangements or features, and indeed many other embodiments, modifications and variations will be ascertainable to those of skill in the art.

What is claimed is:

1. A method comprising:
   displaying a representation of a commercial establishment on a portable device;
   obtaining transmitter data via the portable device from a wireless transmitter located within the commercial establishment;
   in response to the portable device receiving a user selection of a point corresponding to a first location displayed on the representation of the commercial establishment, associating the first location with the transmitter data and location information generated by the portable device representative of a physical location in the commercial establishment; and
   in response to the transmitter data not being associated with product, requesting the user to input the product data of the product proximate the wireless transmitter.

2. A method as defined in claim 1, further including associating the first location with the product data of the product proximate the wireless transmitter.

3. A method as defined in claim 1, wherein the location information includes location coordinates.

4. A method as defined in claim 1, wherein the representation of the commercial establishment is a map of an interior portion of the commercial establishment.

5. A method as defined in claim 1, wherein the transmitter data is obtained via a radio frequency signal.

6. A method as defined in claim 1, wherein the transmitter data is obtained by scanning a barcode located on the wireless transmitter.

7. A method as defined in claim 1, wherein the representation of the commercial establishment is a map, the portable device is a tablet device including a radio frequency identification (RFID) reader, the user selection is received via a touch interface, and the wireless transmitter is an RFID tag.

8. A tangible computer readable storage disk comprising instructions which, when executed, cause a portable device to at least:
   display a representation of a commercial establishment
   obtain transmitter data transmitted by a wireless transmitter located within the commercial establishment;
   in response to receiving a user selection of a first location on the representation of the commercial establishment, (1) generate location information representing a physical location within the commercial establishment, and (2) store the first location in association with (a) the transmitter data and (b) the location information; and
   in response to the transmitter data not being associated with product data, request the user to input the product data of the product proximate the wireless transmitter.

9. A tangible computer readable storage disk as defined in claim 8, wherein the instructions, when executed, cause the portable device to associate the first location with the product data of the product proximate the wireless transmitter.

10. A tangible computer readable storage disk as defined in claim 8, wherein the location information includes location coordinates.

11. A tangible computer readable storage disk as defined in claim 8, wherein the representation of the commercial establishment is a map of an interior portion of the commercial establishment.

12. A tangible computer readable storage disk as defined in claim 8, wherein the transmitter data is obtained via a radio frequency signal.

13. A tangible computer readable storage disk as defined in claim 8, wherein the transmitter data is obtained by scanning a barcode located on the wireless transmitter.

14. A tangible computer readable storage disk as defined in claim 8, wherein the representation of the commercial establishment is a map, the portable device is a tablet device including a radio frequency identification (RFID) reader, the user selection is received via a touch interface, and the wireless transmitter is an RFID tag.

15. A portable device comprising:
   a processor:
   memory in communication with the processor, the memory including machine readable instructions which, when executed by the processor, cause the portable device to:
      display a representation of a commercial establishment;
      access transmitter data obtained from a wireless transmitter located within the commercial establishment;
      in response to a user selection of a first location on the representation of the commercial establishment, (1) generate location information representative of a physical location in the commercial establishment, and (2) associate the first location with (a) the transmitter data and (b) the location information; and
      in response to the transmitter data not being associated with product data, request the user to input the product data of the product proximate the wireless transmitter.

16. A portable device as defined in claim 15, wherein the instructions, when executed, cause the processor to associate the first location with the product data of the product proximate the wireless transmitter.

17. A portable device as defined in claim 15, wherein the location information includes location coordinates.

18. A portable device as defined in claim 15, wherein the representation of the commercial establishment is a map of an interior portion of the commercial establishment.

19. A portable device as defined in claim 15, wherein the transmitter data is obtained via a radio frequency signal.

20. A portable device as defined in claim 15, wherein the transmitter data is obtained by scanning a barcode located on the wireless transmitter.

21. A portable device as defined in claim 15, wherein the representation of the commercial establishment is a map, the portable device is a tablet device including a radio frequency identification (RFID) reader, the user selection is received via a touch interface, and the wireless transmitter is an RFID tag.

\* \* \* \* \*